Aug. 16, 1966 W. F. PRAEG 3,267,370
MAGNETICALLY SHIELDED APPARATUS FOR INDICATING THE
NUMBER OF TURNS AND THE PRESENCE OF
SHORTED TURNS IN ELECTRIC COILS
Filed March 11, 1963 6 Sheets-Sheet 1
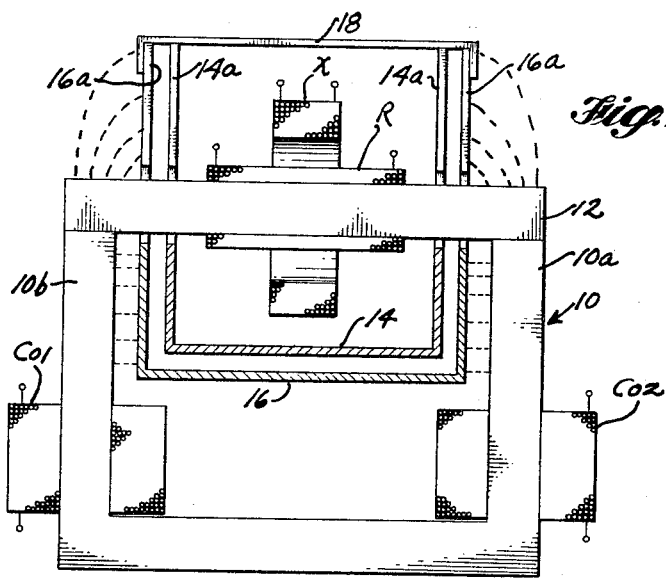
Fig. 1. (PREVIOUS DESIGN)
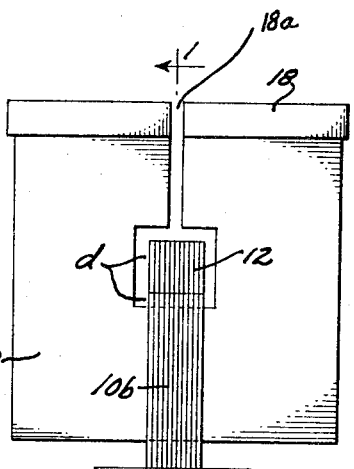
Fig. 2.
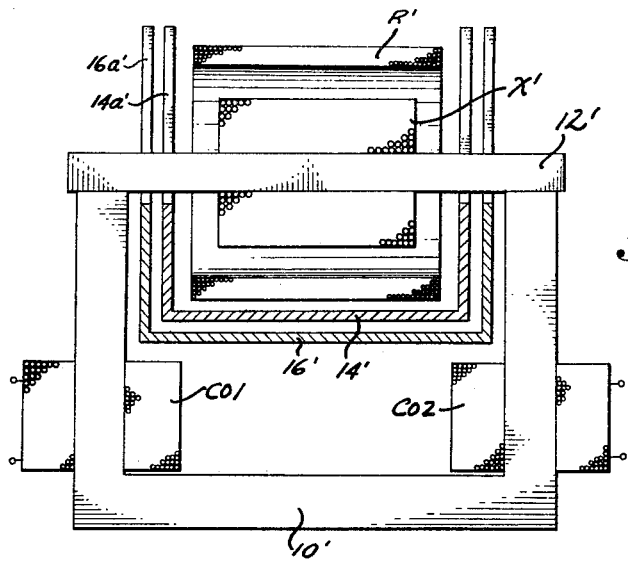
Fig. 3a. (PREVIOUS DESIGN)
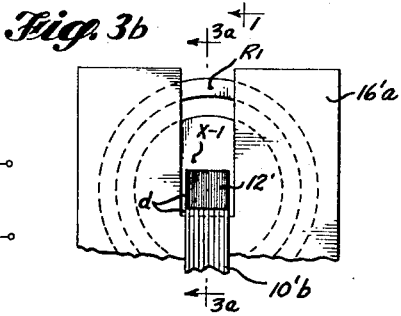
Fig. 3b
INVENTOR.
WALTER F. PRAEG
BY
Reynolds & Christensen
ATTORNEYS

INVENTOR.
WALTER F. PRAEG

INVENTOR.
WALTER F. PRAEG
BY

ATTORNEYS

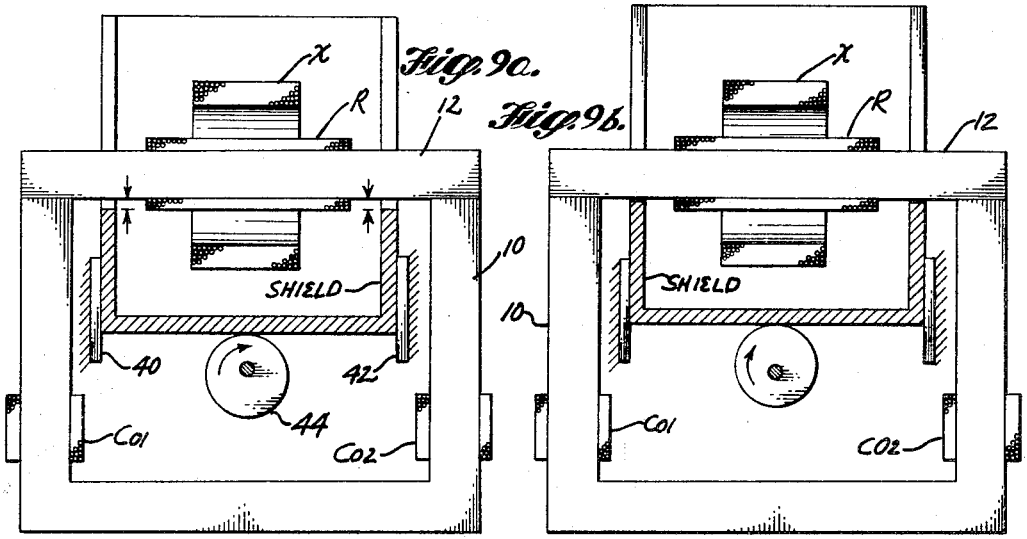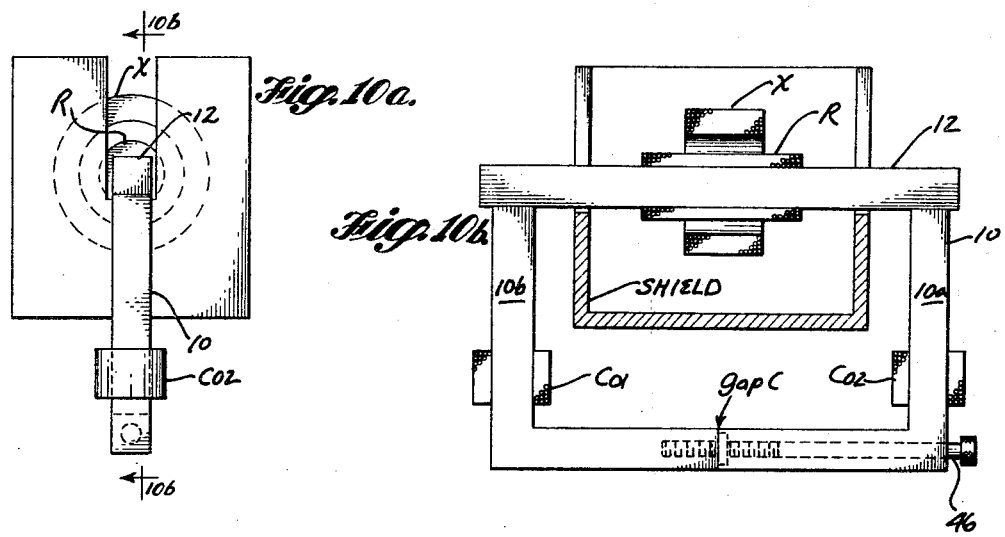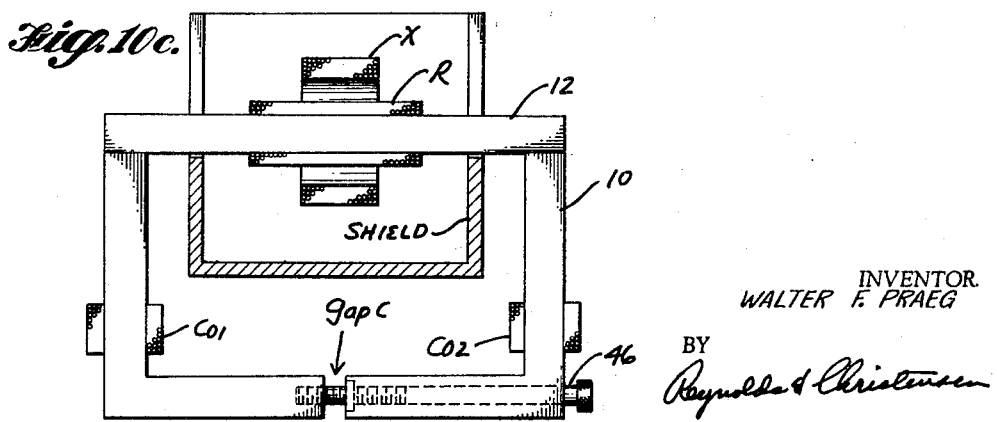

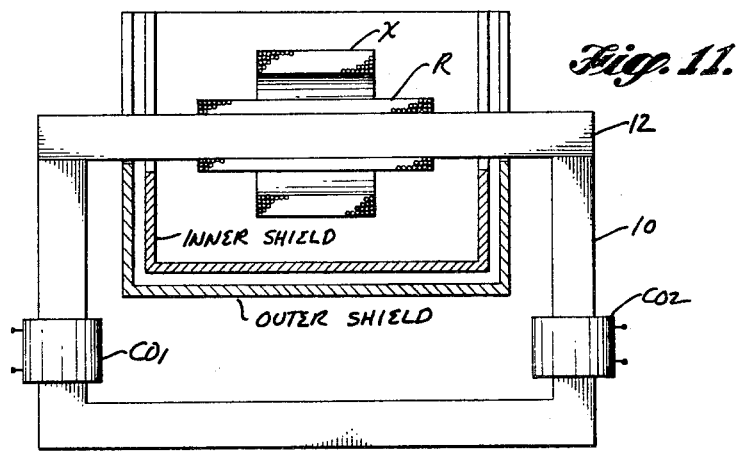
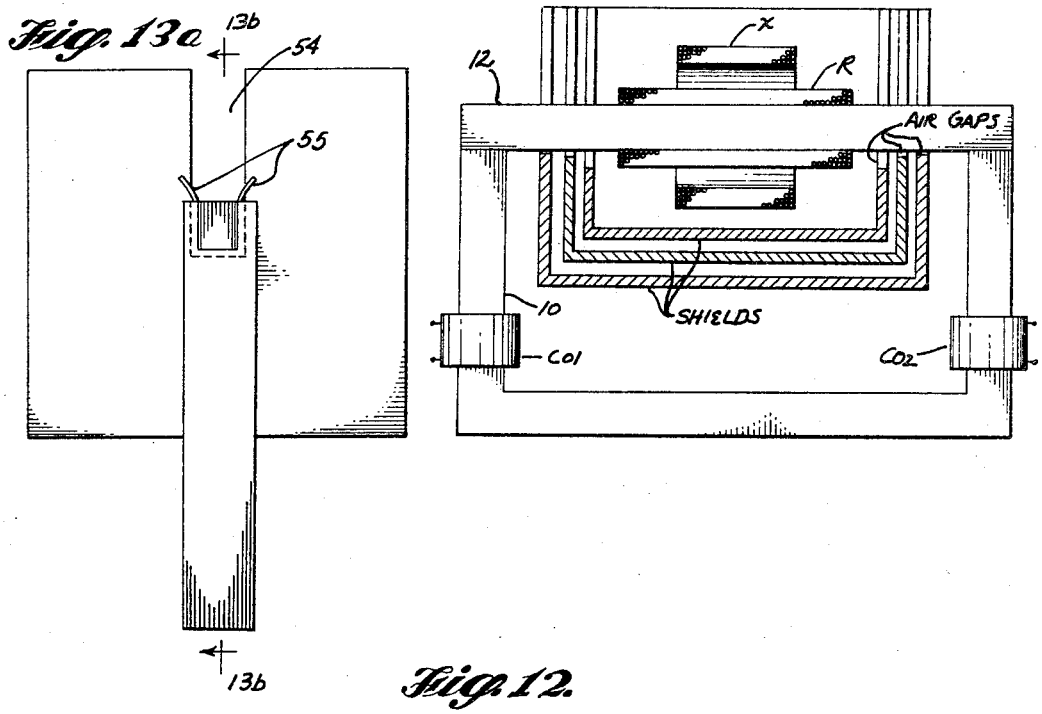
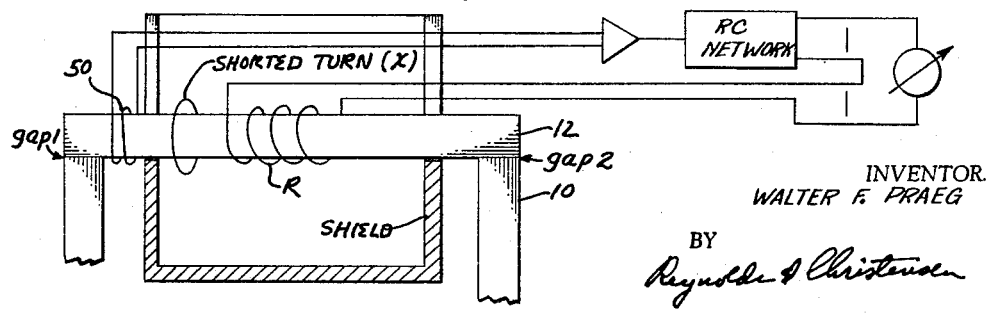

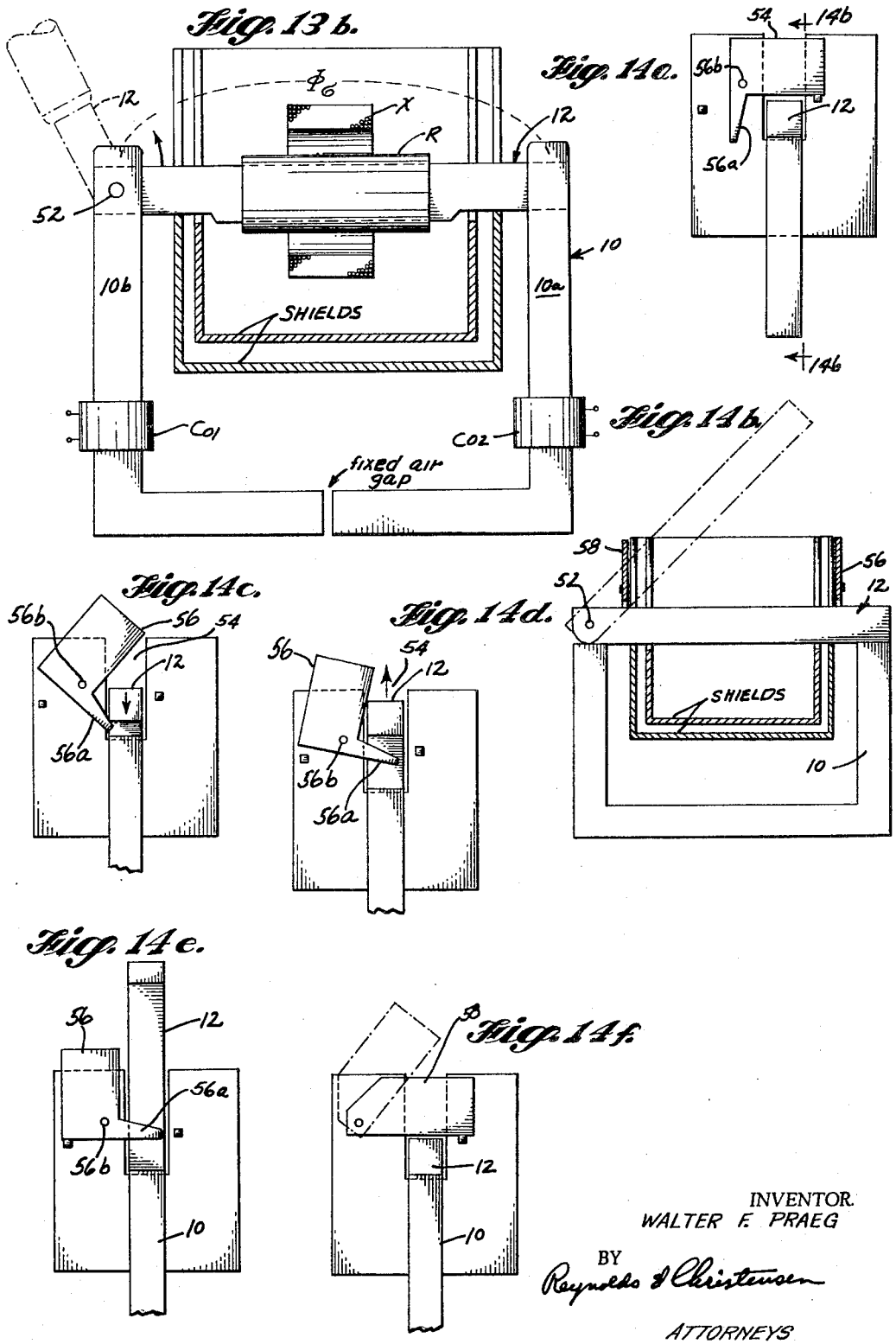

United States Patent Office 3,267,370
Patented August 16, 1966

3,267,370
MAGNETICALLY SHIELDED APPARATUS FOR INDICATING THE NUMBER OF TURNS AND THE PRESENCE OF SHORTED TURNS IN ELECTRIC COILS
Walter F. Praeg, 11731 Glen Road, R.R. 1, Palos Park, Ill.
Filed Mar. 11, 1963, Ser. No. 264,223
12 Claims. (Cl. 324—55)

This invention relates to apparatus for measuring the number of turns and for detecting the presence of shorted turns in electrical coils. More particularly the present invention is directed in part to improvements by which sensitivity of the device to detect short-circuited turns may be increased substantially without impairing accuracy thereof for measuring number of turns in a coil. Preferred embodiments of the invention are described illustratively herein; however, it will be recognized that certain modifications and changes therein with respect to details may be made without departing from the essential features involved. In the manufacture of electrical equipment using transformers, reactors, relays, etc., measurement of the number of turns in the electrical coils employed and testing for short circuits therein are standard quality control procedures with reliable manufacturers. Generally speaking, these measurements and tests have been made heretofore, as with devices employing the present invention, by comparing voltages induced in the coil under test and in a known reference coil by alternating magnetic flux common to both coils. Earlier work done by the present applicant, and not claimed in the present application, provided a testing device of this general nature employing a flux shield by which stray flux between the reference coil and the coil under test was minimized or virtually eliminated as a means to achieve greater accuracy in the measurement of number of coil turns. The test coil and reference coil surrounded a ferromagnetic core section comprising part of a primary ferromagnetic circuit structure which is subjected to alternating magnetic flux by a magnetizing coil. A ferromagnetic shield which at least partially encloses that portion of the core section which is surrounded by the reference coil and the test coil minimizes stray flux which could have a differential effect on the two coils. Voltage induced in the test coil is compared with that induced in the reference coil as a means to measure number of turns in the test coil. The presence of shorted turns in the test coil is detected in the same apparatus setup but with the test coil terminals disconneced by comparing voltage induced in the reference coil with a known voltage, both with and without the test coil present on the core section. By incorporating a nonferromagnetic gap, i.e. usually an air gap, in the ferromagnetic shield, preferably divided into two parts, one between each end of the shield and the adjacent side of the core section, the total shielding effect is enhanced.

Preferably the standard coil took the shape of a single layered coil permanently wound on the yoke, thereby substantially reducing the physical dimensions of the device and allowing the testing of coils of small interior diameter. Moreover, with coils having short-circuited turns, such as for purposes of damping, pulse shaping, etc., it was found possible to measure or count the remaining number of turns with a high degree of accuracy.

However, it has been found with those earlier devices that optimized design for measuring number of turns results in reduced sensitivity for detecting the presence of shorted turns, and vice versa. Accordingly, an object of this invention is to provide in a single testing device the capability of performing both functions without design compromises which sacrifice the results from either.

Still another object is to achieve these results in a testing device which accepts both core-wound and open-core coils and which operates substantially independently of coil shape or size within the space limitations of the shield structure.

With the present improvements, the objectives stated above are achieved by varying the relationship between reluctance of the primary ferromagnetic loop structure and reluctance of the secondary ferromagnetic loop structure which includes the shield and a portion of the core section enclosed by the shield. The variation is controlled such that the secondary loop reluctance is made proportionately lower for the shorted turns test of the test coil than it is for the measurement of the number of turns of such test coil.

In one embodiment such variation is effected by varying the effective length of the air gaps in the ferromagnetic loop including the shield and the core section. In a different embodiment an air gap is formed in the external portion of the primary ferromagnetic loop structure and this gap is increased for the shorted-turns test above its length for the measurement of number of coil turns. Alternatively, both such techniques may be employed to the same end.

In still another embodiment moving parts are not required but instead the shield structure comprises two or more separate ferromagnetic shells, one within the other, with the outer shell having a proportionately lesser reluctance than the inner shell with respect to passage of flux generated by shorted turns in the test coil. In addition the reluctance of the primary loop for flux generated by shorted turns in the test coil may be increased by inserting a fixed and relatively large air gap in the primary loop.

Other features of the invention reside in the preferred construction by which the core (yoke) section is pivotally mounted on the ends of legs comprising part of the primary ferromagnetic structure said yoke operating slot covers to increase the shielding effect; in certain details of shield construction involving movable elements actuated by extension and retraction of the pivoted core section in order to remove or insert test coils; and in the means for enchancing sensitivity of the operatively associated circuit apparatus by which shorted turns in the test coil are detected, namely, by use of a separate pickup coil inductively linked with the core section outside the shield, in lieu of a reference alternating voltage comprising part of the energizing circuit producing primary magnetization of the ferromagnetic system.

These and other features, objects and advantages of the invention will become more fully evident from the following description thereof by reference to the accompanying drawings.

FIGURE 1 is a longitudinal sectional view taken on line 1—1 in FIGURE 2, showing a magnetic coil measuring and testing device of previous design.

FIGURE 2 is an end view of said device.

FIGURE 3a is a view similar to FIGURE 1 showing a device of similar design adapted for measurement of core-wound test coils in which the ferromagnetic coil core becomes part of the primary ferromagnetic circuit.

FIGURE 3b is an end view of the device shown in FIGURE 3a.

FIGURES 9a and 9b are simplified longitudinal sectional views of a modified test device incorporating improvements of this invention.

FIGURE 10a is an end view of a second embodiment of this invention.

FIGURE 10b is a longitudinal sectional view taken on line 10b—10b in FIGURE 10a; FIGURE 10c is a view similar to FIGURE 10b showing the device in a different operating setting.

FIGURE 11 is a view similar to FIGURE 1 showing another embodiment wherein optimized operating conditions for measuring number of turns and for testing for shorted turns are achieved without moving parts in the ferromagnetic system.

FIGURE 11a is a modification of the embodiment shown in FIGURE 11.

FIGURE 12 is a simplified schematic diagram showing an improved technique for detecting the effect of shorted turns on reference coil voltage during a shorted-turns test utilizing the invention.

FIGURE 13a is an end view of still another modification; whereas FIGURE 13b is a longitudinal sectional view thereof taken on line 13b—13b in FIGURE 13a.

FIGURE 14a is an end view of still another modification, which is basically similar to that shown in FIGURE 13; FIGURE 14b is a longitudinal sectional view taken on line 14b—14b in FIGURE 14a; and FIGURE 14c is an end view similar to FIGURE 14a showing a different operating position of the slot cover in the shield used in this embodiment.

FIGURES 14d and 14e are similar to FIGURE 14c but show different stages in the operation of the slot cover.

FIGURE 4f is a view from the opposite end of the device shown in FIGURE 14c, illustrating a modified slot cover applicable to the end of the shield adjacent the pivoted end of the yoke of the core section.

Figure 4:
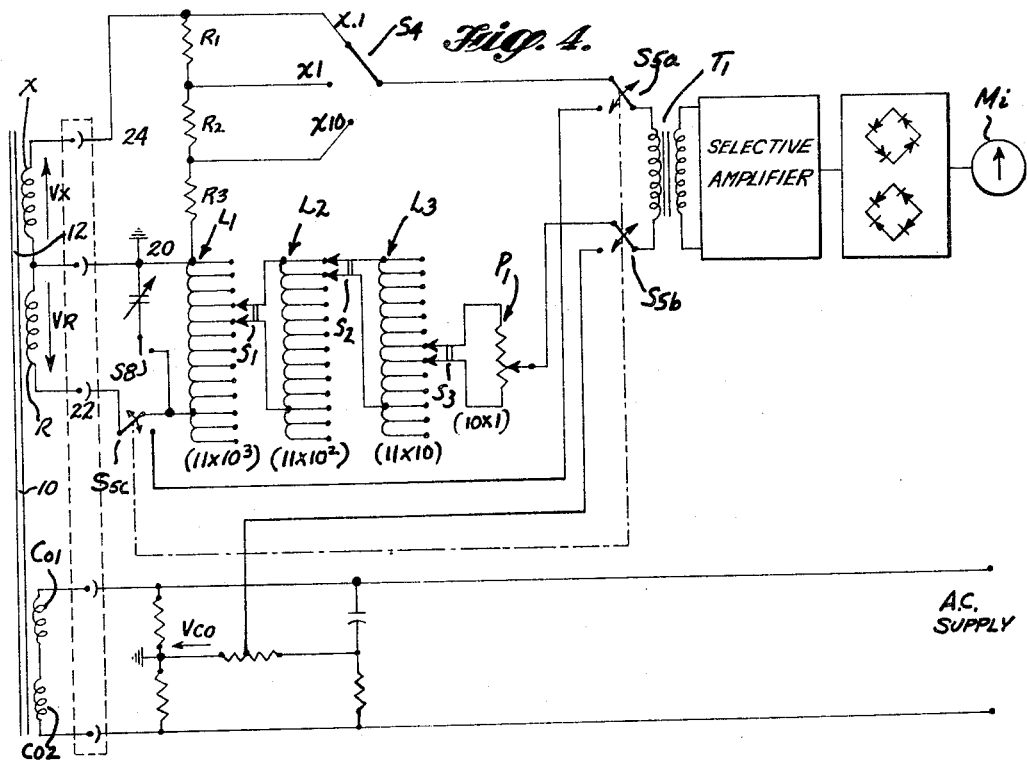
FIGURE 4 is a schematic diagram of the test circuit operatively associated with the measurement and test devices.

Coil testers and turns measuring devices used prior to the type shown in FIGURES 1, 2 and 3 were subject to critical design conditions and were unduly limited as to the shape and size of coils that could be tested. Such limitation was due to the effect of stray flux which would link the test coil but not the reference coil, or vice versa. In those designs as in the present improved designs the basic test technique was to measure number of turns of the test coil or test for shorted turns by inducing a voltage therein and by inducing a voltage in a reference coil, employing alternating flux in a ferromagnetic circuit path common to both coils. The further problem of permitting insertion and removal of the coil to be tested created air gaps giving rise to nonuniform magnetic flux distribution. Measurement errors were held at acceptably low values only by maintaining substantially identical spatial distribution of the turns and their relative position in the magnetic circuit, with respect to both the test coil and the reference coil. Such devices were impracticable for testing core-wound coils (i.e., coils permanently mounted on an open ferromagnetic core, as in the case of some relay coils, for example).

In the prior art devices as in the present system, number of turns of a test coil may be determined from the induced voltages in various ways. For example, with the voltages known and the number of turns on the reference coil accurately known, the number of turns on the test coil may be readily computed from the direct proportional relationship between voltage and number of turns in a coil. Alternatively, the voltage induced in the test coil can be applied in series with that induced in the reference coil, and out of phase therewith, in a circuit incorporating a zero-centered high-impedance voltmeter calibrated in number of turns or adapted to provide a reading from which number of turns can be computed. As a third alternative, comparator circuits may be used in which the induced voltage in the reference coil may be compensated to zero when compared with the induced voltage in test coil, and the setting of the compensating device noted as a means to compute number of turns. Bridge circuit nulling, with appropriate potentiometer or variable transformer devices, represents still another alternative method of measuring number of turns using the two induced voltages.

In order to measure number of coil turns with an accuracy of 0.1% (plus or minus) by a method of comparing the voltage induced in such coil with the voltage induced in a reference coil of a known number of turns, it is necessary to limit stray flux between the coils to 0.1% or less. The former device shown in FIGURES 1, 2 and 3 virtually achieved that result. Such device comprises a primary ferromagnetic circuit structure formed by the U-shaped member 10 having legs 10a and 10b bridged by the ferromagnetic yoke or core section 12. The latter is surrounded by the reference coil R and by the test coil X. The primary ferromagnetic circuit is subject to alternating magnetomotive force by the two magnetizing coils Co1 and Co2 placed on the legs. The test coil and standard coil and the portion of core section 12 upon which they are mounted are surrounded by a shield device comprising an inner ferromagnetic shell 14 and an outer ferromagnetic shell 16. The shell ends and the cover have air gaps at 14a, 16a and 18a to prevent the shields from acting as short circuited loops. Air gaps d are large enough to permit the assembly of yoke 12 and reference coil R to be removed horizontally in order to insert test coil X when 18 is lifted. As shown in FIGURES 3a and 3b the shell ends may be slotted at 14'a and 16'a respectively above the core section 12' in order to permit insertion and removal of the yoke section through the top side of the shield structure (cover plate 18 is usually not required). A feature of any such device was its provision of air gaps d in the shield structure around the core section 12 as a means to increase the reluctance of the secondary ferromagnetic circuit which included the shields 14 and 16 and the enclosed portion of core section 12 (yoke) so as to virtually eliminate stray flux within the shield. Such a technique permitted the reference coil to take the shape of a single layered coil, for example, as shown at R in FIGURE 1, permanently wound on the movable core section 12, thereby reducing physical dimensions and allowing the testing of coils of small interior diameter. In the alternative embodiment shown in FIGURES 3a and 3b the reference coil R' is made of larger interior cross section to enable testing of core-wound test coils X' by the expedient of substituting the straight ferromagnetic core of the coil itself for the core section 12 of the ferromagnetic system, such coil core being designated 12' in this instance. In other respects the device shown in FIGURES 3a and 3b was generally similar to that shown in FIGURES 1 and 2.

In such a prior device measurement of number of turns could be achieved readily with the circuit apparatus shown in FIGURE 4. As shown in this figure, magnetizing coils Co1 and Co2 are mounted on the comparator core 10 as are reference coil R and test coil X, the latter two being connected with a common ground junction at 20 and with output terminals at 22 and 24 respectively which are of opposite polarity with respect to each other. Induced reference coil voltage $V_R$ is impressed across the winding of ratio transformer $L_1$ whereas induced test coil voltage $V_X$ is impressed across the voltage divider comprising series resistances R1, R2 and R3. These resistances and switch S4 selectively engageable with the contact terminals X.1, X1 and X10, as shown, comprise a decade arrangement.

One side of ratio transformer L1 is grounded as shown. Successive coils or coil groups in this inductance have contact terminals selectively engageable by the conjointly movable spaced contact pairs of switch S1. The contacts of switch S1 are connected across the primary of ratio transformer L2. The latter has successive coils or coil groups provided with contact terminals selectively engageable by the conjointly movable spaced contact pairs of switch S2, which in turn are connected across the primary of ratio transformer L3. The latter is likewise provided with a series of contact terminals selectively engageable by spaced switch contactors S3. The terminals of switch contactor S3 are connected across the potentiometer winding P1 whose variable wiper terminal is connected through switch S5b to one side of the primary of transformer T1. In effect, L1, L2 and L3 represent variable potentiometer devices, the output voltages of which are added in series with each other and with the output voltage of potentiometer P1, and each of which is a vernier adjustment (one-tenth scale) of that next preceding it in the series. Since the voltages $V_R$ and $V_X$ are 180 degrees out of phase appropriate setting of the transformer switches S1, S2 and S3 and of the wiper of potentiometer P1 will produce an alternating voltage with reference to ground which exactly balances the alternating voltage across by voltage divider R1, R2, R3 applied to one side of transformer T1 through switch S5a. Output of the transformer secondary is applied to a selective amplifier which delivers its output through a rectifier to a null indicating meter $M_i$.

If the number of turns of test coil X is larger than that of reference coil R, the induced voltage in the test coil may be reduced in decade steps by changing the setting of switch S4, which setting then becomes a multiplying factor in determining the value of the number of turns of test coil X by noting the settings of transformer switches S1, S2, S3 and the wiper of potentiometer P1 when the meter $M_i$ indicates a null condition.

The capacitance of the coil X under test may be so great that the capacitive current through it can no longer be neglected. The voltage drop in the coil due to this capacitive current is not in phase with the induced voltage $V_X$. Consequently, an exact zero compensation between $V_X$ and $V_R$ is no longer possible unless $V_R$ is similarly loaded. Variable capacitor C is provided in the circuit which, through switch S8, can be connected across the reference coil R in order to provide this compensation.

In order to utilize the circuit shown in FIGURE 4 for determining the presence or absence of shorted turns in test coil X, switch S5 is moved to the alternative position shown in the figure, which applies a fixed compensating voltage $V_{Co}$ through the alternative contact of switch S5b to one side of the primary of transformer T1, and which applies the full reference coil induced voltage $V_R$ to the opposite side of the primary of transformer T1 through the alternative contacts of S5c and S5a. If, with no test coil X present in the test apparatus, the voltage balance $V_R - V_{Co}$, as detected in meter $M_i$, is the same as with the test coil present, then it will be known that no shorted turns exist in the test coil. However, if there are shorted turns present in the test coil the resultant counter-magnetomotive force thus produced in the primary magnetic circuit will reduce the output voltage induced in reference coil R, and this will deflect the meter $M_i$.

While such a circuit apparatus has been used heretofore, it is particularly useful in connection with the novel features of comparator construction representing the present invention and therefore has been described herein in order to illustrate the best mode of practicing the present improvements.

Figures 5A, 5C:
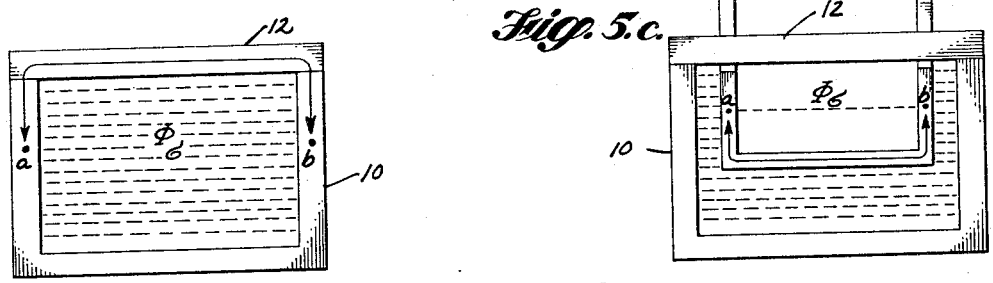
FIGURES 5a, 5b and 5c are schematic views illustrating the effect of a shield on stray flux in the region containing the test coil and reference coil in such a device.
Figure 5B:
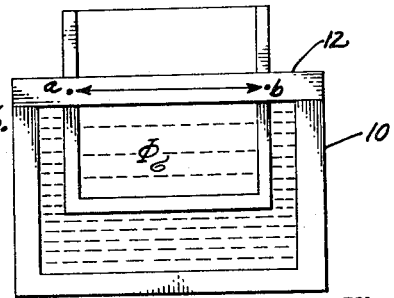
Figure 6:
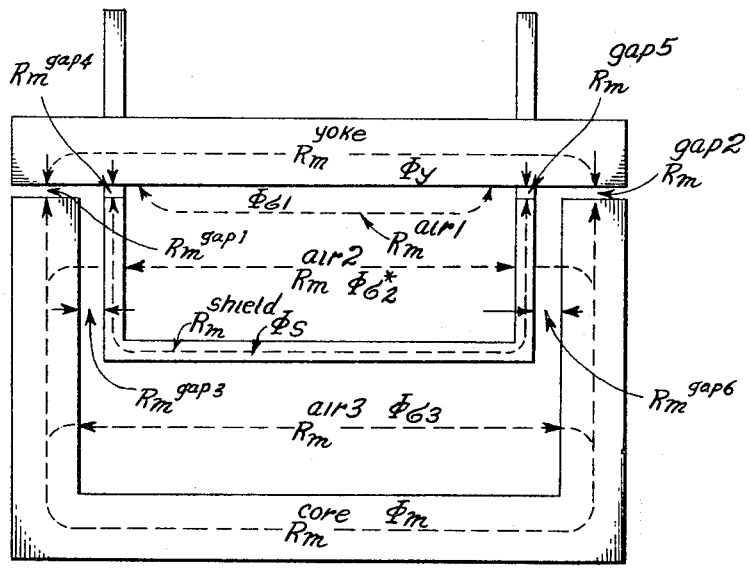
FIGURE 6 is a simplified diagram of the ferromagnetic structure shown in the device of FIGURE 1, for example, for purposes of analyzing the flux paths, reactance factors and air gaps.
Figure 7:
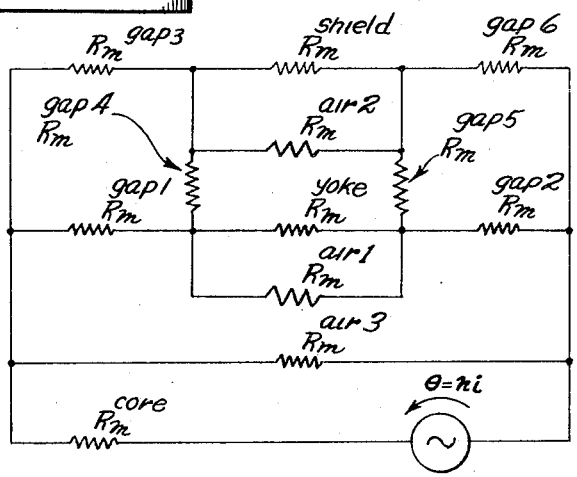
FIGURE 7 is an equivalent magnetic circuit diagram.

As a further basis for understanding the improvements presented by this invention, reference is made initially to FIGURE 5 and thereupon to FIGURES 6, 7 and 8, which depict the ferromagnetic phenomenon occurring in the test device. In FIGURE 5A stray flux $\phi_\sigma$ around the yoke is proportional essentially to the reluctance of the air gaps between the yoke 12 and the ferromagnetic circuit structure 10, plus the reluctance of the yoke itself, and approximately one-third of the length of structure 10.

FIGURE 5B illustrates the effect of the shield around the yoke or core section 12 in reducing the stray flux within the space enclosed by the shield. Now the stray flux is reduced to an amount proportional only to the reluctance of the yoke between points "a" and "b" (i.e., adjacent the termini of the shield) and the shield itself. That is, the stray flux due to the gaps between the core 10 and yoke 12 has been eliminated.

FIGURE 5C illustrates that by introducing air gaps between the ends of the shield and the adjacent sides of the yoke the shielding effect is considerably enchanced for eliminating stray flux in the area enclosed by the shield. In this regard it will be noted that stray flux within the shield is proportional to the magnetic potential along the shield (i.e., between points a and b). This potential is no longer as great as the potential along the yoke because of the fact that the latter potential is divided between the air gaps shown and the reluctance of the shield itself between points a and b. With high permeability shield material and suitable air gaps, the shield reluctance is only a small fraction of the air gap reluctance, so that, to all intents and purposes, stray flux within the shielded area is virtually eliminated.

Referring now to FIGURE 6 and to its equivalent magnetic circuit shown in FIGURE 7, the stray flux $\phi_\sigma$ may be defined as follows:

$$\phi_\sigma = \phi_{\sigma 1} + \phi^*_{\sigma 2} = \phi_Y \left(\frac{R_m^{yoke}}{R_m^{air1}}\right) + \phi_s \left(\frac{R_m^{shield}}{R_m^{air2}}\right)$$

where $$R_m = l/\mu A$$

with $l$ = length of magnetic path
$\mu$ = permeability of magnetic path
$A$ = area of magnetic path Shield flux $\phi_s$ consists of two components as follows: $\phi_s = \phi_{s'} + \phi_{s''}$, where $\phi_{s'}$ is the flux emitted from the yoke which reaches the shield through the air gaps 4 and 5 and $\phi_{s''}$ is the flux emitted from the core legs 10a and 10b reaching the shield through the air gaps 3 and 6. Now fluxes $\phi_{s'}$ and $\phi_{s''}$ produce stray flux $\phi_{\sigma 2'}$ and $\phi_{\sigma 2''}$ respectively which, combined, make up stray flux $\phi^*_{\sigma 2}$ within the shield.

Neglecting $R_m^{air2}$, which is the reluctance of the shielded air space and which is parallel to the reluctance of the shield ($R_m^{shield}$) and very much larger than $R_m^{shield}$, the fluxes $\phi_{s'}$ and $\phi_{s''}$ can be expressed as follows:

$$\phi_{s'} = \phi_Y \left[\frac{R_m^{yoke}}{R_m^{gap4} + R_m^{shield} + R_m^{gap5}}\right]$$

$$\phi_{s''} = \phi_Y \left[\frac{\tfrac{1}{4} R_m^{core} + R_m^{gap1} + R_m^{yoke} + R_m^{gap2}}{R_m^{gap3} + R_m^{shield} + R_m^{gap6}}\right]$$

Since $R_m^{shield} \ll R_m^{gap3}, R_m^{gap4}, R_m^{gap5}, R_m^{gap6}$ $R_m^{yoke} \ll R_m^{gap1}, R_m^{gap2}$ $\tfrac{1}{4} R_m^{core} \ll R_m^{gap1}, R_m^{gap2}$ the total stray flux within the shield can be written:

$$\phi_\sigma = \phi_{\sigma 1} + \phi^*_{\sigma 2} = \phi_{\sigma 1} + \phi_{\sigma 2'} + \phi_{\sigma 2''}$$

$$\phi_\sigma = \phi_Y \left[\frac{R_m^{yoke}}{R_m^{air1}} + \frac{R_m^{shield}}{R_m^{air2}} \left(\frac{R_m^{yoke}}{R_m^{gap4} + R_m^{gap5}} + \frac{R_m^{gap1} + R_m^{gap2}}{R_m^{gap3} + R_m^{gap6}}\right)\right]$$

With the above analysis it is established that for purposes of measuring the number of turns in the test coil X it is desirable to employ a yoke or core section 12 of high magnetic permeability and relatively large cross section, a shield of high magnetic permeability and relatively large cross section, air gaps 1 and 2 as short or small as possible in order to maintain a low reluctance across these gaps, air gaps 3 and 6 (i.e., between the shield ends and the adjacent core legs 10a and 10b) which are sufficiently large to keep $\phi_{\sigma 2''}$ small, and air gaps 4 and 5 which are sufficiently large to keep $\phi_{\sigma 2'}$ small.

It will also be apparent from the above formulae that the value of $\phi^*_{\sigma 2}$ is only a small fraction of that of $\phi_{\sigma 1}$.

Figure 8A:
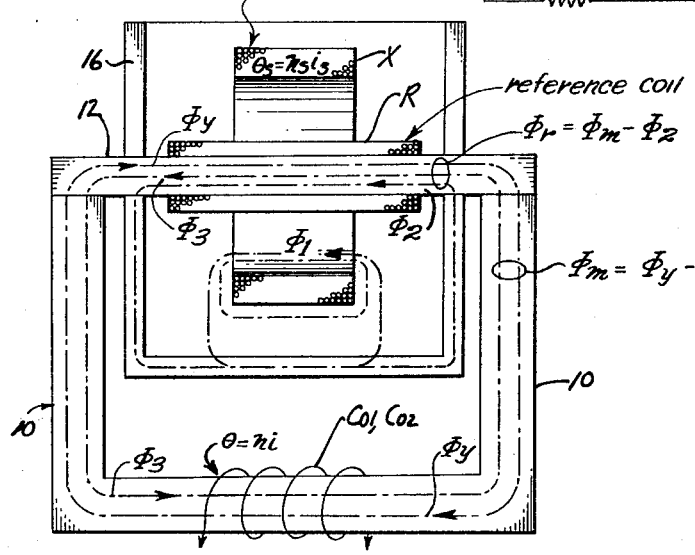
FIGURE 8a is a simplified analytical diagram of the same device showing the flux paths caused by shorted turns in the test coil.

Referring now to FIGURE 8a for an understanding of the phenomena attending shorter turns measurement using the apparatus, when $ni$ ampere turns of mangetizing force ($\theta$) are applied to the core 10 with the terminals of test coil X open, any shorted turns, $n_s$, in the test coil will sustain current, $i_s$, producing a countermagnetizing force, $\theta_s$, and associated flux $\phi_s$. $\phi_s$ will be made up of three components of flux $\phi 1$, $\phi 2$ and $\phi 3$. $\phi 1$ represents flux lines linked with the coil under test only, $\phi 2$ flux lines linked with both the coil under test and the reference coil, and $\phi 3$ flux lines linked with the coil under test, the reference coil and the excitation coils Co1, Co2. Only the flux returning through the shield (i.e., $\phi 2$) is of significance for the detection of shorted coil turns since $\phi 1$ has no effect on the reference coil voltage Vr, and flux $\phi 3$ is compensated or offset by primary current flowing through the excitation coil.

Figure 8B:
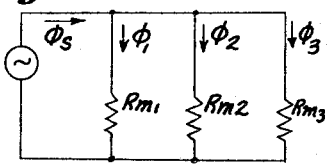
FIGURE 8b is an equivalent magnetic circuit diagram.

With reference to FIGURE 8b the ampere turns ($\theta_s$) of the shorted turns of test coil X, and the fluxes $\phi 1$, $\phi 2$ and $\phi 3$ are interrelated as follows:

$$\theta_s = n_s i_s = \phi_s R_{ms} = \phi_1 R_{m1} = \phi_2 R_{m2} = \phi_3 R_{m3} \quad (1)$$

where $R_{m1}$, $R_{m2}$, $R_{m3}$ = reluctance of various flux paths.

$\phi_s = \phi_1 + \phi_2 + \phi_3$ = total flux due to shorted turns (2)

$$R_{ms} = \frac{R_{m1} R_{m2} R_{m3}}{R_{m1} R_{m2} + R_{m1} R_{m3} + R_{m2} R_{m3}} \quad (3)$$

from (1) and (3)

$$\Phi_2 = \Phi_s \frac{R_{ms}}{R_{m2}} = \phi_s \frac{R_{m1} R_{m3}}{R_{m1} R_{m2} + R_{m1} R_{m3} + R_{m2} R_{m3}} \quad (4)$$

Since $R_{m1} \gg R_{m2}$, $R_{m3}$ Equation 3 can be written $$R_{ms} \approx \frac{R_{m2} R_{m3}}{R_{m2} + R_{m3}} \quad (3^1)$$

Which simplifies Equation 4 to $$\phi_2 = \phi_s \frac{R_{ms}}{R_{m2}} \approx \phi_s \frac{R_{m3}}{R_{m2} + R_{m3}} \quad (4^1)$$

From the foregoing it will be apparent that $\phi 2$ is a maximum and that the highest degree of sensitivity to shorted turns to the test coil is achieved when $R_{m2}$ (i.e., reluctance of the flux path including the shield) is made as small as possible, or for a given value of $R_{m2}$, if $R_{m3}$ (i.e., reluctance in the path traversed by flux $\phi 3$) is made as large as possible relatively.

In addition it has now been observed that because of the low reluctances of the yoke, core and shield, compared to that of air, flux $\phi 1$ is very much smaller than fluxes $\phi 2$ and $\phi_m$. Moreover, since fluxes $\phi 2$ and $\phi_m$ are linked with both the coil under test and the reference coil the number of unshorted turns in the test coil can still be measured with considerable accuracy and the measurement error will only be proportional to $\phi 1$, which is very small.

Of particular significance herein, it is observed that the requirement for a low reluctance path for flux $\phi 2$ in order to provide apparatus sensitivity in detecting the presence of shorted turns in the test coil is in conflict with the requirements, stated above, for accuracy in measuring number of turns of the test coil. Thus, it is observed that air gaps 4 and 5 (FIGURE 6) should be large enough to keep $\phi_{\sigma 2'}$ small for accuracy in measuring number of turns in the test coil, whereas these air gaps should be made as small as possible for sensitivity in detecting the presence of shorted turns in the test coil.

The present invention recognizes problems arising from these relationships and provides solutions for the same. In accordance with the embodiment shown in FIGURES 9a and 9b, the shield is shown mounted between guides 40 and 42 for reciprocative movement thereof toward and from the core section 12 in order to vary the length of air gaps 4 and 5. In this case such movement is effected by manual rotation of the actuating cam 44 suitably mounted in fixed relation to the core structure. Thus, for measurement of number of turns of test coil X, cam 44 is rotated so as to increase the length of the air gaps 4 and 5 to a value sufficient to satisfy the above-described requirements for negligible stray flux in the region enclosed by the shield. However, in order to test the coil X for the presence of shorted turns the cam 44 is rotated to the position shown in FIGURE 9b wherein the air gaps 4 and 5 are reduced to zero as nearly as possible so as to maximize the sensitivity of the apparatus to detect presence of shorted turns. (In so doing not only is $\phi 2$ increased but $\phi 3$ is decreased, referring to FIGURE 8).

In the embodiment shown in FIGURES 10a, 10b and 10c a result which is approximately equivalent to that attained in FIGURE 9 is achieved by forming the core structure 10 in two parts which are variably separable to form an air gap C (preferably in the bridging portion). A paramagnetic screw 46 actuates the parts toward and from each other in order to vary the length of this air gap. In FIGURE 10b the air gap is reduced substantially to zero which is the condition desired for measuring number of turns of the test coil X. In FIGURE 10c the air gap is opened to a substantial length by suitable rotation of the actuating screw 46 in order to condition the apparatus to detect the presence of shorted turns in the test coil with the desired high degree of sensitivity.

It will be evident that apparatus incorporating a combination of the features shown in FIGURES 9 and 10 may also be used to achieve equivalent results or enhanced results; however, either separate arrangement in itself is normally sufficient in order to optimize the conditions for the two types of testing or measurement using the same apparatus.

In FIGURE 11 the problem is solved without mechanical adjustment or movement of elements establishing or affecting any of the flux paths. Instead the magnetic circuit is designed such that a low reluctance $R_{m2}$ is presented for flux $\phi 2$ when testing for short circuited turns, whereas sufficient gap reluctance in gaps 4 and 5 (effectively) is achieved in order to keep the value of $\phi_{\sigma 2'}$ small. In this instance, the shield assembly comprises both an inner shield and an outer shield of fixed form and positioning. The outer shield has its air gaps 4 and 5 as small as practicable whereas the inner shield, spaced inwardly from the outer shield, has its air gaps 4 and 5 as large as necessary to keep the flux $\phi_{\sigma 2'}$ to a negligible value. This dual effect of the multiple shield assembly is attainable because $\phi_{\sigma 2'}$ is determined only by the flux passing through the innermost shield and this flux can be kept low by making the air gaps 4 and 5 of this shield sufficiently large and by having sufficient air gaps between the shields themselves. However, the sensitivity for detection of shorted turns in the test coil X may be made as great as desired because it is practically independent of the inner shield. In other words, this sensitivity is determined primarily by the outer shield which offers a low reluctance path for flux $\phi 2$ due to the reduction of its air gaps 4 and 5 to a very low value.

Of course, as depicted in FIGURE 11a, intermediate shields having air gaps 4 and 5 of intermediate values of length may be interposed between the inner and outer shields shown in FIGURE 11. It will be understood that any number of intermediate shields (i.e., from zero on up)

may be used even though just one is shown in FIGURE 11a.

In the design of test devices of the type shown in FIGURES 11 and 11a it should be realized, of course, that the reluctances of the paths of fluxes $\phi 2$ and $\phi 3$ should be interrelated in order to obtain economically a high sensitivity for the detection of shorted turns in the test coil without sacrificing accuracy and sensitivity for measuring number of turns of that coil. Shield material for the outer shield might be saved by increasing the reluctance value $R_{m3}$ by choosing a core material having a low permeability or by the provision of a fixed air gap in the core section as depicted in FIGURE 10 and shown in FIGURE 13b. Thus, a composite design utilizing the features of FIGURE 11 (or 11a) and FIGURE 10 may in some cases be desirable from the economic standpoint.

FIGURE 12 shows a modified circuit arrangement for use in testing coils for shorted turns. In this case, the value of voltage to be compared with the induced voltage in the reference coil is determined by the flux $\phi_m$ established in the core. This is done by providing a pickup coil 50 inductively linked with the yoke 12 outside the shield. The advantage of this arrangement over that shown in FIGURE 4 lies in the resultant independence of the shorted turns test of line voltage fluctuations and variations in gap 1 and gap 2 due to wear or inclusion of dirt, etc. In the embodiment of FIGURE 4 line voltage fluctuations will alter the value of $V_{Co}$ more than they will the value of $V_R$. However, if the induced voltage $V_R$ from the reference coil is compared with the induced voltage from pickup coil 50 both will be affected proportionately by line voltage variations and changes in gaps 1 and 2, both affecting magnetization of the core system.

FIGURES 13a and 13b illustrate an improved device wherein insertion and removal of test coil X is greatly facilitated. In this instance the yoke 12' is pivotally mounted at 52 on one of the core legs 10b whereas the opposite end of the yoke is free to swing toward and from the other core leg 10a. The shield has a slot 54 therein through which the core is free to swing between its extreme positions shown in FIGURE 10b. Relatively divergent resilient guide strips 55 at the entrance to the notch in the end of core leg 10a facilitate guidance of the free end of the yoke back into its normal operating position shown by solid lines in FIGURE 13b. In this design the shield end walls have slots or openings 54 therein that are wide enough to allow the yoke to swing through a sufficient arc for convenient insertion and removal of test coils X. No cover is mounted on the shield structure as in the prior device shown in FIGURES 1 and 2, for example, yet this does not materially impair the effectiveness of the shield for its intended purpose inasmuch as most of the stray $\phi_s$ will enter the outer shield in the area along the core legs. Moreover, the slots in the shield end walls do not necessarily introduce stray flux within the shield because this flux (indicated by dotted line $\phi_\sigma$—FIGURE 13b) is only proportional to the yoke flux and the yoke reluctance. However, to the extent that such flux may exist (i.e., $\phi_\sigma$) is can be eliminated by arranging ferromagnetic slot covers 56 and 58 across the slots in the end walls of the outer shield. These covers, pivoted at 56b, are or may be actuated by movement of the yoke 12 into and from its normal operating position without interfering with the insertion and removal of coils to be tested. This is shown in FIGURES 14a through 14f. As indicated in FIGURES 14b, 14c, 14d and 14e, a tab 56a projects from the lower corner of the yoke cover 56 beneath the pivot 56b thereof. This tab is swung into a displaced position projecting across the slot 54 when the yoke is raised and the cover 56 is swung aside (FIGURE 14e). When the yoke is lowered into normal position this tab is contacted by the yoke and is swung laterally outwardly in order to trip the slot cover 56 (FIGURE 14c) into its position shown in FIGURE 14a. The opposite slot cover 58 is gravity operated and, as in the case of the slot cover 56, is temporarily displaced out of operating position by the yoke itself when the latter is raised.

It will be evident that if a shield cover (i.e., to be disposed over the top of the shield) is provided as in the devices of FIGURES 1 and 2 it also may be mounted for actuation if desired by raising and lowering the movable yoke and so that it does not interfere with insertion and removal of test coils.

These and other aspects of the invention will be recognized by those skilled in the art from the foregoing disclosure of the presently preferred practices of such invention.

I claim as my invention:

1. In a device for measuring number of unshorted turns and for detecting the presence of shorted turns in an electrical coil, said device comprising means forming a primary ferromagnetic circuit including a coil core section therein surrounded by a reference coil and by the coil under test, means to apply alternating magnetomotive force to the primary ferromagnetic circuit, ferromagnetic shield means at least partially enclosing at least the portion of said core section surrounded by said reference coil and test coil, and electrical circuit means operatively associated with the reference and test coils and alternatively operable during such application of magnetomotive force to detect voltages induced in both the test coil and reference coil for measuring number of test coil turns, and to detect voltage induced in the reference coil with the test coil terminals open for detecting the presence of shorted turns in the test coil; said shield means cooperating with said portion of core section to form a low-reluctance ferromagnetic shielding circuit in by-pass relation to a portion of said primary circuit and having a nonferromagnetic gap therein which substantially increases the total shielding circuit reluctance, thereby to suppress stray flux in the coil space enclosed by the shield during coil turns measurement; means operatively associated with said coil core section and operable, during shorted-turns testing, to provide a test coil shorted turns ferromagnetic flux path which extends serially through said core section portion and exteriorly extends around both coils and which during such testing has a low reluctance relative to the reluctance of the shielding circuit during operation of the latter when measuring number of coil turns.

2. The combination defined in claim 1, wherein the last-mentioned means comprises provision for reducing the effective length of said nonferromagnetic gap for the shorted-turns test compared with the length thereof established during measurement of number of coil turns.

3. The combination defined in claim 1, wherein the nonferromagnetic gaps comprise air gaps located immediately between the shield and the core section, and wherein the means operatively associated with the core section comprises means to reduce the effective length of said gaps by bodily shifting the shield toward the core section for the shorted-turns test from its position established for measurement of number of coil turns.

4. The combination defined in claim 1, wherein the last-mentioned means comprises a second ferromagnetic shield means disposed outside the first shield and extending in similar enclosing relationship to the coils, said second ferromagnetic shield means having relatively a lower reluctance than the first shield means to the magnetizing force of test coil shorted turns.

5. The combination defined in claim 4, wherein both the first and second shield means comprise similar ferromagnetic high-permeability shield structures, and the first ferromagnetic shield means has its effective reluctance increased over that of the second shield means by reason of the nonferromagnetic gap in series with the first shield means.

6. In a device for measuring number of unshorted turns and for detecting the presence of shorted turns in an electrical coil, said device comprising means forming a primary ferromagnetic circuit including a coil core section therein surrounded by a reference coil and by the coil under test, means to apply alternating magnetomotive force to the primary ferromagnetic circuit, ferromagnetic shield means at least partially enclosing at least the portion of said core section surrounded by said reference coil and test coil, and electrical circuit means operatively associated with the reference and test coils and alternatively operable during such application of magnetomotive force to detect voltages induced in both the test coil and reference coil for measuring number of test coil turns, and to detect voltage induced in the reference coil with the test coil terminals open for detecting the presence of shorted turns in the test coil; said shield means cooperating with said portion of core section to form a low-reluctance ferromagnetic shielding circuit in by-pass relation to a portion of said primary circuit and having a nonferromagnetic gap therein which substantially increases the total shielding circuit reluctance, thereby to suppress stray flux in the coil space enclosed by the shield during coil turns measurement; means operatively associated with the shield means and ferromagnetic circuit and operable to establish a decrease in the proportionality of the test coil shorted-turns magnetization reluctance of the shield to that of the primary ferromagnetic circuit for and during the shorted-turns test, as compared with such proportionality for and during measurement of the number of test coil turns.

7. The combination defined in claim 6, wherein the means forming the primary ferromagnetic circuit includes a variable nonferromagnetic gap therein situated exteriorly of the shield means, and the means operatively associated with the shield means and ferromagnetic circuit is operable to vary such latter gap.

8. The combination defined in claim 6, wherein the last-mentioned means operates on the shield to vary the effective length of the nonferromagnetic gap thereof.

9. The combination defined in claim 6, wherein the last-mentioned means comprises a second ferromagnetic shield means disposed outside the first shield and extending in similar enclosing realtionship to the coils, said second ferromagnetic shield means having relatively a lower reluctance than the first shield means to the magnetizing force of test coil shorted turns.

10. The combination defined in claim 6, wherein the electrical circuit means includes a pickup coil inductively linked with the primary ferromagnetic circuit, and means to compare voltages induced in the reference coil and pickup coil with and without the presence of the test coil in the shield, thereby to detect presence of shorted turns in the test coil.

11. The combination defined in claim 6, wherein the means forming the primary ferromagnetic circuit includes a pair of legs having end portions bridged by the coil core section, the core section being pivotally mounted at one end on one such leg to permit swinging of the other end away from normal position proximate to the other such leg, thereby to permit removal and placement of test coils on such core section.

12. The combination defined in claim 11, wherein opposite end walls of the shield means have slots therein through which the movable core section swings, and at least one core section-actuated closure plate movably mounted on one such end wall for movement between normal position superimposed over and covering the adjacent slot and retracted position permitting core section movement to and from its normal position.

References Cited by the Examiner

UNITED STATES PATENTS

| 2,432,948 | 12/1947 | Thompson | 324—52 |
| 2,921,255 | 1/1960 | Norton | 324—55 X |

FOREIGN PATENTS

| 888,892 | 2/1962 | Great Britain. |

WALTER L. CARLSON, *Primary Examiner.*

G. R. STRECKER, *Assistant Examiner.*